(12) United States Patent
Ma et al.

(10) Patent No.: US 9,888,048 B1
(45) Date of Patent: Feb. 6, 2018

(54) SUPPORTING MILLIONS OF PARALLEL LIGHT WEIGHT DATA STREAMS IN A DISTRIBUTED SYSTEM

(71) Applicant: EMC Corporation, Hopkinton, MA (US)

(72) Inventors: Lili Ma, Beijing (CN); Zhanwei Wang, Beijing (CN); Lei Chang, Beijing (CN); Tao Ma, Beijing (CN); Lirong Jian, Beijing (CN); Luke Lonergan, San Carlos, CA (US)

(73) Assignee: EMC IP Holding Co. LLC, Hopkinton, MA (US)

( * ) Notice: Subject to any disclaimer, the term of this patent is extended or adjusted under 35 U.S.C. 154(b) by 374 days.

(21) Appl. No.: 13/853,519

(22) Filed: Mar. 29, 2013

Related U.S. Application Data

(60) Provisional application No. 61/769,043, filed on Feb. 25, 2013.

(51) Int. Cl.
*G06F 15/16* (2006.01)
*H04L 29/06* (2006.01)

(52) U.S. Cl.
CPC .................................. *H04L 65/60* (2013.01)

(58) Field of Classification Search
CPC . H04L 12/5693; H04L 47/10; H04L 12/2856; H04L 12/2872; H04L 12/5601
See application file for complete search history.

(56) References Cited

U.S. PATENT DOCUMENTS

| | | | | |
|---|---|---|---|---|
| 5,920,568 | A * | 7/1999 | Kurita et al. | 370/412 |
| 6,700,871 | B1 * | 3/2004 | Harper et al. | 370/235 |
| 8,060,645 | B1 * | 11/2011 | Catania | H04L 1/1838 709/224 |
| 8,520,673 | B2 * | 8/2013 | Chen | H04L 45/16 370/312 |
| 8,549,184 | B2 * | 10/2013 | Tang | G06F 13/385 710/5 |
| 2005/0063392 | A1 * | 3/2005 | Ofuji et al. | 370/395.42 |
| 2005/0094667 | A1 * | 5/2005 | Dahlman et al. | 370/473 |
| 2006/0069787 | A1 * | 3/2006 | Sinclair | G06F 17/3089 709/229 |
| 2007/0074150 | A1 * | 3/2007 | Jolfaei | G06F 9/4881 717/103 |
| 2008/0033920 | A1 * | 2/2008 | Colclasure | G06F 17/30442 |
| 2008/0109573 | A1 * | 5/2008 | Leonard et al. | 710/24 |
| 2009/0059928 | A1 * | 3/2009 | Enomoto | H04L 1/1841 370/394 |
| 2009/0319634 | A1 * | 12/2009 | Tanaka | G06F 15/16 709/212 |

(Continued)

*Primary Examiner* — Younes Naji
(74) *Attorney, Agent, or Firm* — Barry N. Young

(57) ABSTRACT

A system for sending a command stream comprises a first input interface, a processor, and an output interface. The first input interface is configured to receive a call. The processor is configured to determine one or more packets for the call. The one or more packets are able to be reassembled to form the call. The processor is configured to assign a first packet of the one or more packets to a first output queue and assign the second packet to a second output queue in the event there is a second packet of the one or more packets for the call. The output interface configured to send the first packet from the first output queue.

21 Claims, 6 Drawing Sheets

(56) References Cited

U.S. PATENT DOCUMENTS

| | | | |
|---|---|---|---|
| 2010/0279733 A1* | 11/2010 | Karsten | H04W 48/18 455/552.1 |
| 2012/0072596 A1* | 3/2012 | Kruse | G06F 17/3012 709/226 |
| 2012/0084419 A1* | 4/2012 | Kannan | H04L 67/1002 709/223 |
| 2012/0120848 A1* | 5/2012 | Hegde | H04L 69/162 370/255 |
| 2014/0201388 A1* | 7/2014 | Dajani | H04L 69/16 709/232 |

* cited by examiner

SUPPORTING MILLIONS OF PARALLEL LIGHT WEIGHT DATA STREAMS IN A DISTRIBUTED SYSTEM

CROSS REFERENCE TO OTHER APPLICATIONS

This application claims priority to U.S. Provisional Patent Application No. 61/769,043 entitled INTEGRATION OF MASSIVELY PARALLEL PROCESSING WITH A DATA INTENSIVE SOFTWARE FRAMEWORK filed Feb. 25, 2013 which is incorporated herein by reference for all purposes.

BACKGROUND OF THE INVENTION

In a system that increases processing speed using many processor units in parallel, demands of access to data for the system also increase. Connections and communications between the many processor units and the data system typically require significant resources that can be overwhelmed as the system scales up. This is especially a problem for a data access resource that is a singular resource (e.g., an index) needed for all the processing units to be able to access the data in the data system.

BRIEF DESCRIPTION OF THE DRAWINGS

Various embodiments of the invention are disclosed in the following detailed description and the accompanying drawings.

DETAILED DESCRIPTION

Figure 1:
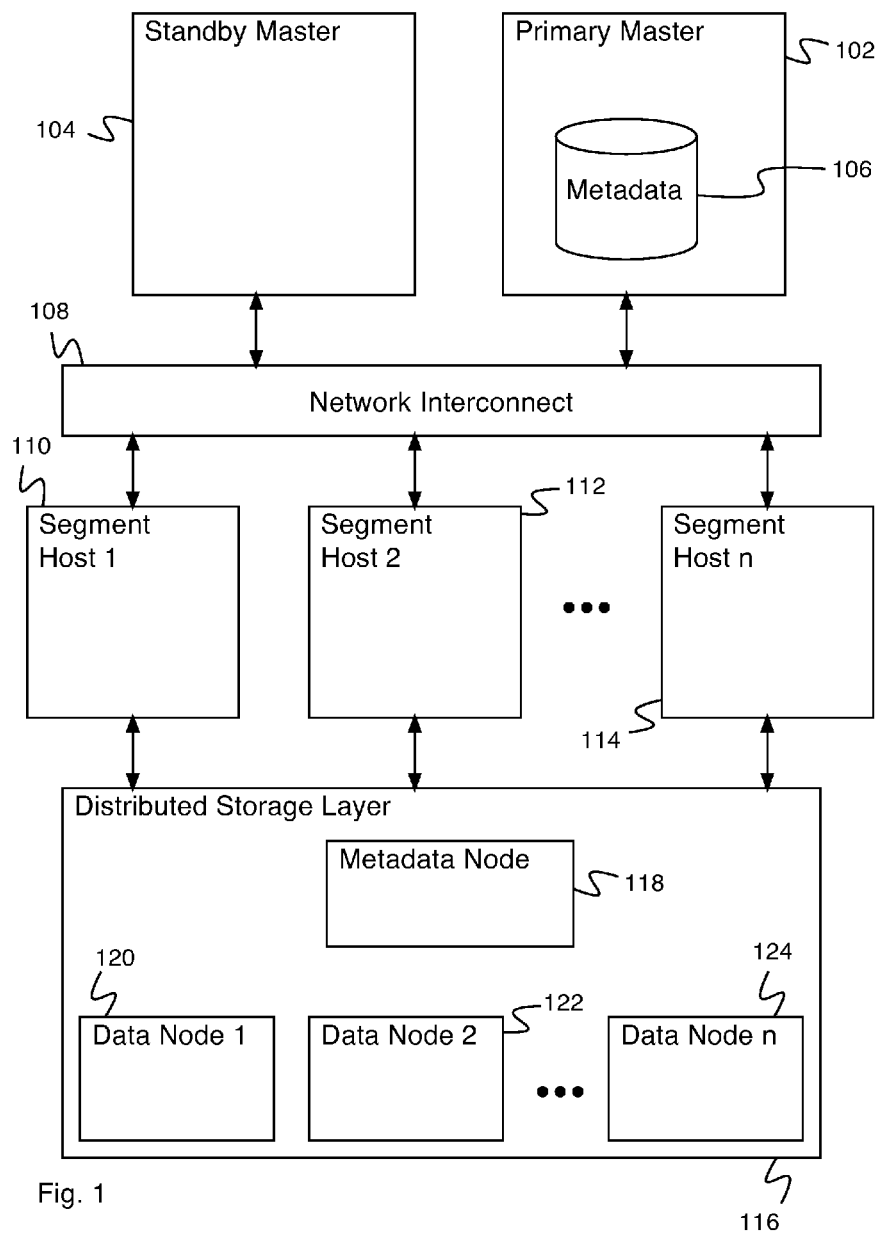
FIG. 1 is a block diagram illustrating an embodiment of a large scale distributed system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A method for supporting millions of parallel light weight data streams in a distributed system is disclosed. A system for sending a command stream comprises a first input interface configured to receive a call; a processor configured to determine one or more packets for the call, wherein the one or more packets are able to be reassembled to form the call; assign a first packet of the one or more packets to a first output queue; and, in the event there is a second packet of the one or more packets for the call, assign the second packet to a second output queue. The system for sending a command stream additionally comprises an output interface configured to send the first packet from the first output queue. The system for sending a command stream additionally comprises a memory coupled to the processor and configured to provide the processor with instructions.

Each compute segment of a massive parallel processing system accesses data in a data node of a distributed data storage system and accesses metadata in a metadata node of the distributed data storage system. Typically there are many data nodes but only one metadata node. Calls sent from the compute segment to the metadata node are typically very simple (e.g., filesystem commands such as copy file, delete file, show file location, etc.), however the metadata node can become overwhelmed by the number of network connections open by the segments issuing calls. In order to lessen the load on the metadata node, a connectionless protocol (e.g., UDP, user datagram protocol) is used. The metadata node does not need to maintain connection state information for each connection but just respond to packets as they are received. Commands from segments are broken into packets that can be reassembled and delivered one by one. UDP does not guarantee receipt of a packet through the network, so an acknowledgement protocol is used. When the metadata node receives a packet, it sends an acknowledgement to the segment, once the segment receives the acknowledgement, it sends the next segment. If the acknowledgement is not received within a predetermined time, the packet is resent and the predetermined time is increased (e.g., doubled each successive time—for example, an original wait time is 1x, and is doubled to 2x, and then to 4x, and then to 8x, etc.), to slow the overall flow of packets to the metadata node. Packets are collected by the metadata node, and when an entire call has been received, it is reassembled and added to a call queue. The call is executed when it reaches the head of the call queue, and the result of the call returned to the segment. In some embodiments, the result of the call is transmitted back to the segment using the same UDP protocol with acknowledgement as was used for transmitting the call to the metadata node.

FIG. 1 is a block diagram illustrating an embodiment of a large scale distributed system. In the example shown, the large scale distributed system of FIG. 1 includes a large cluster of commodity servers. The master hosts include a primary master 102 and a secondary master 104. The primary master 102 is responsible for accepting queries; planning queries, e.g., based at least in part on system metadata 106, which in various embodiments includes information indicating where data is stored within the system; dispatching queries to segments for execution; and collecting the results from segments. The standby master 104 is a warm backup of the primary master 102. The network interconnect 108 is used to communicate tuples between execution processes. The compute unit of the database engine is called a "segment". Each of a large number of segment hosts, represented in FIG. 1 by segment hosts 110, 112, and 114, can have multiple segments. The segments on segment hosts 110, 112, and 114, for example, are configured to execute tasks assigned by the primary master 102, such as to perform assigned portions of a query plan with respect to data stored in distributed storage layer 116, e.g., a Hadoop® or other storage layer.

Distributed storage layer 116 comprises metadata node 118 and a large number of data nodes, e.g., data nodes 120, 122, and 124. Metadata node 118 comprises metadata describing data stored on the data nodes of distributed storage layer 116. In various embodiments, embodiments, metadata comprises file names, file storage locations (e.g., which data node a file is stored on), file directory paths, file sizes, file modification times, file permissions, or any other appropriate metadata. In some embodiments, any file system call performed by a segment on data stored within the distributed storage layer (e.g., indicate directory contents, indicate file path, indicate file storage location, change file name, copy file, delete file, create new file, etc.) is sent from the segment to metadata node 118. Segment operations on file data (e.g., read file data, write file data, modify file data, delete file data) are sent from the segment directly to the appropriate data node.

Figure 2:
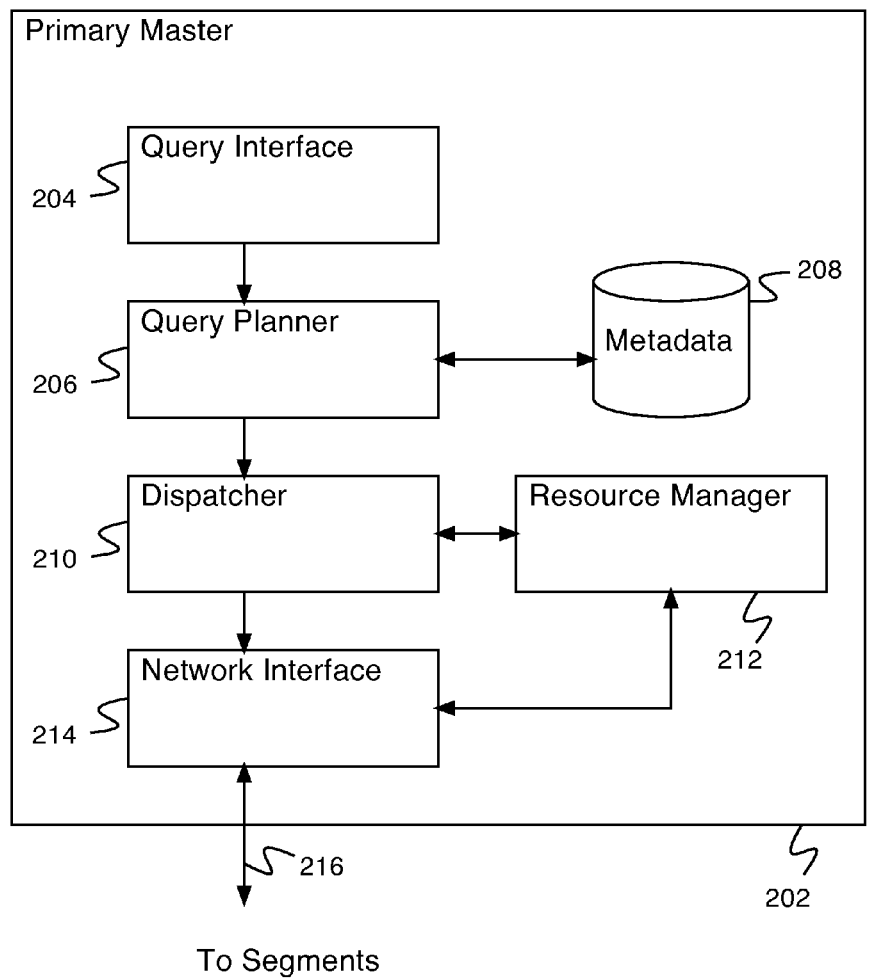
FIG. 2 is a block diagram illustrating an embodiment of a primary master system.

FIG. 2 is a block diagram illustrating an embodiment of a primary master system. In some embodiments, primary master 202 comprises primary master 102 of FIG. 1. In the example shown, the primary master 202 comprises one or more processors, memory, and/or non-volatile storage devices, such as a disk drive (not shown). The processor(s) is/are configured in the example shown to provide a query interface 204, for example a user interface code configured to receive a query, such as one entered via an input device such as a keyboard, either locally or remotely and sent to the primary master 102, e.g., via a network. The query interface 204 provides query data to a query planner 206 configured to use metadata 208 to create a query plan. The query plan is divided into independently executable subparts (e.g., slices). A dispatcher 210 uses information about segment availability, load, etc., from a resource manager 212 to select for each slice of the query plan a corresponding subset of segments to perform processing required by that slice. The dispatcher 210 forms and sends to each of the selected segments, via a network interface 214 (e.g., a network interface card or NIC) and a network connection 216, a communication that includes data indicating the processing to be performed by that segment and metadata to be used to perform assigned processing.

Figure 3:
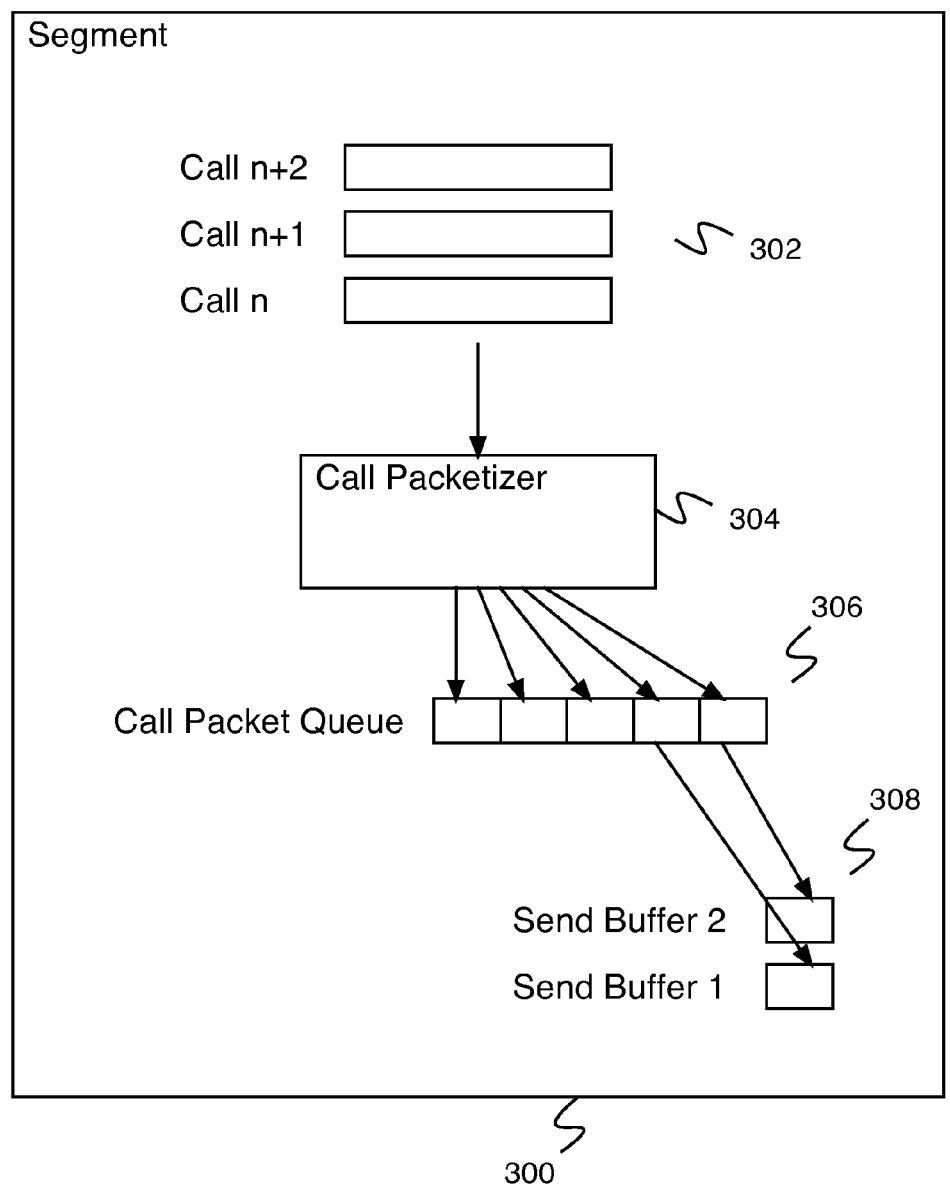
FIG. 3 is a block diagram illustrating an embodiment of a segment.

FIG. 3 is a block diagram illustrating an embodiment of a segment. In some embodiments, segment 300 comprises a segment running in segment host 110 of FIG. 1. In the example shown, segment 300 comprises a set of metadata node calls 302. Metadata node calls comprise calls destined for a metadata node (e.g., metadata node 118 of FIG. 1). In some embodiments, metadata node calls comprise file system calls (e.g., indicate directory contents, indicate file path, indicate file storage location, change file name, copy file, delete file, create new file, etc.). In some embodiments, executing metadata node calls comprises a part of executing a slice of a query. Each metadata node call is sent in turn to call packetizer 304. Call packetizer 304 takes a call data and breaks it up into a set of one or more packets, where the one or more packets can be reassembled into the call. In some embodiments, call packetizer 304 produces a set of UDP packets. In some embodiments, packets produced by call packetizer 304 comprise a subset of the call data. In various embodiments, packets produced by call packetizer additionally comprise one or more of: the internet protocol (IP) address for segment 300, the host name for segment 300, the listening port for segment 300, the call serial number, the number of packets needed for the call, the index of the current packet within the call, a checksum of the packet data, or any other appropriate packet data. Call packets produced by call packetizer 304 are stored in call packet queue 306. In some embodiments, call packet queue 306 comprises a shift queue of packets, storing a set of packets produced by call packetizer 304 and outputting them one at a time to send buffers 308. After call packetizer 304 loads a set of packets for a call into call packet queue 306, it produces a set of packets for the following call and loads them into call packet queue immediately behind the packets for the first call. Packets are loaded into send buffers 308 and sent one at a time, delivering the data comprising each call in turn. Send buffers 308 comprise two send buffers. In some embodiments, a first packet is sent from send buffer 1, and the segment waits to receive a first acknowledgement. In some embodiments, if a first acknowledgement to the first packet is not received within a predetermined time, the first packet is resent. In order to prevent the metadata node from being flooded with resent packets, each time the first packet is resent, the predetermined time to wait for the first acknowledgement is increased. In some embodiments, each time the packet is resent, the predetermined time to wait for the acknowledgement is increased in an exponential manner. In some embodiments, each time the packet is resent, the predetermined time to wait for the acknowledgement is doubled.

Once a first acknowledgement is received, a second packet is sent from send buffer 2, a third packet is loaded into send buffer 1 (e.g., from call packet queue 306), and the system waits to receive a second acknowledgement. In some embodiments, if a second acknowledgement to the second packet is not received within a predetermined time, the second packet is resent. In order to prevent the metadata node from being flooded with resent packets, each time the second packet is resent, the predetermined time to wait for the second acknowledgement is increased. In some embodiments, each time the packet is resent, the predetermined time to wait for the second acknowledgement is increased in an exponential manner. In some embodiments, each time the packet is resent, the predetermined time to wait for the second acknowledgement is doubled. Once an acknowledgement for the second packet is received, the third packet is sent from send buffer 1, and a fourth packet is loaded into send buffer 2, and so on. In some embodiments, if the first packet comprises a complete call (e.g., when the call was packetized, only one packet was necessary), when the packet is sent and an acknowledgement received, a first packet of a new call is sent from send buffer 2. In some embodiments, if an acknowledgement to a sent packet is not received within a predetermined time, the packet is resent. In order to prevent the metadata node from being flooded with resent packets, each time the packet is resent, the predetermined time to wait for the acknowledgement is increased. In some embodiments, each time the packet is resent, the predetermined time to wait for the acknowledgement is increased exponentially. In some embodiments, each time the packet is resent, the predetermined time to wait for the acknowledgement is doubled.

In some embodiments, packets are sent simultaneously from send buffer 1 and from send buffer 2. For each send buffer, once an acknowledgement for the packet is received, a new packet is loaded into the send buffer and sent. In some embodiments, whenever a send buffer is empty (e.g., the packet is acknowledged as having been successfully sent) the send buffer is loaded form the call packet queue (e.g., with a next packet for the current call or a packet for a next call).

Figure 4:
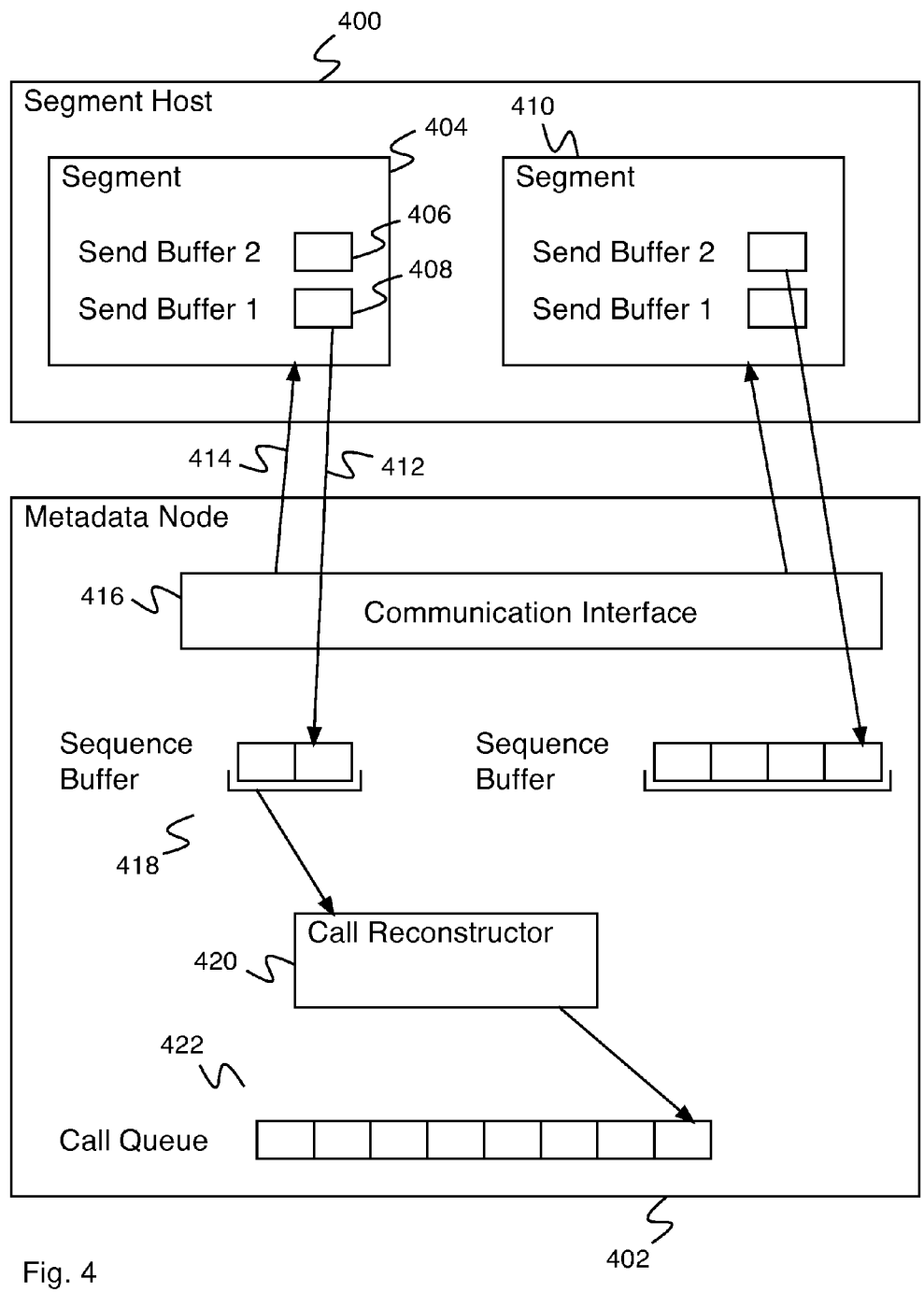
FIG. 4 is a block diagram illustrating an embodiment of a segment host and a metadata node.

FIG. 4 is a block diagram illustrating an embodiment of a segment host and a metadata node. In some embodiments, segment host 400 comprises segment host 110 of FIG. 1 and metadata node 402 comprises metadata node 118 of FIG. 1. In the example shown, segment host 400 comprises segment 404 and segment 410 communicating with metadata node 402. In various embodiments, segment host 400 includes a plurality of segments (e.g., 3, 4, 5, 6, 10, or 100 segments, etc.). Each segment comprises two send buffers (e.g., send buffer 1 408 and send buffer 2 406). Packets are sent from the send buffers to metadata node 402 (e.g., via connection 412). When a packet is received by communication interface 416, it is delivered to a sequence buffer (e.g., sequence buffer 418) and an acknowledgement of the packet is transmitted back to the segment (e.g., via connection 414). In some embodiments, connection 412 and 414 comprise UDP connections. Sequence buffer 418 comprises a sequence buffer for reconstructing a sequence of packets into a call. In the example shown, metadata node 402 comprises multiple sequence buffers for reconstructing multiple sequences (e.g., sent by multiple segments) into calls. When a sequence buffer determines that all packets in a sequence have been received (e.g., by comparing the number of packets received with a sequence length stored in one or more of the packets), the sequence buffer delivers the sequence to call reconstructor 420. Call reconstructor 420 creates a call from a set of packets. In some embodiments, call reconstructor performs the inverse function of call packetizer 304 of FIG. 3. Call reconstructor 420 delivers the reconstructed call to call queue 422 and places it on the end of the queue. Metadata node 402 processes calls from call queue in the order they were added to the queue.

When a segment needs to make a system call to a metadata node as part of a query, rather than opening a TCP (e.g., transmission control protocol) connection to the metadata node and performing the call, the call is broken into a set of UDP packets by a packetizer and sent one by one. The load on the metadata node is considerably reduced by the connectionless nature of the UDP protocol. UDP cannot guarantee reception of the packet, so the system is modified to manually perform an acknowledgement. When a packet is received by the communication interface of the metadata node, the interface sends an acknowledgement to indicate to the segment that the packet was received successfully and the next packet should be sent. The segment waits a predetermined period of time after sending the packet; if the acknowledgement is received within the predetermined time it proceeds to send the next packet, if the acknowledgement is not received within the predetermined time it proceeds to resend the packet. In order to prevent the metadata node from being flooded with resent packets, each time the packet is resent the predetermined time waited for the acknowledgement is increased. As packets are received by the metadata node they are stored in a sequence buffer. Once the sequence buffer has received the correct number of packets for the call, the call is reconstructed from the packets and added to the call queue.

Figure 5:
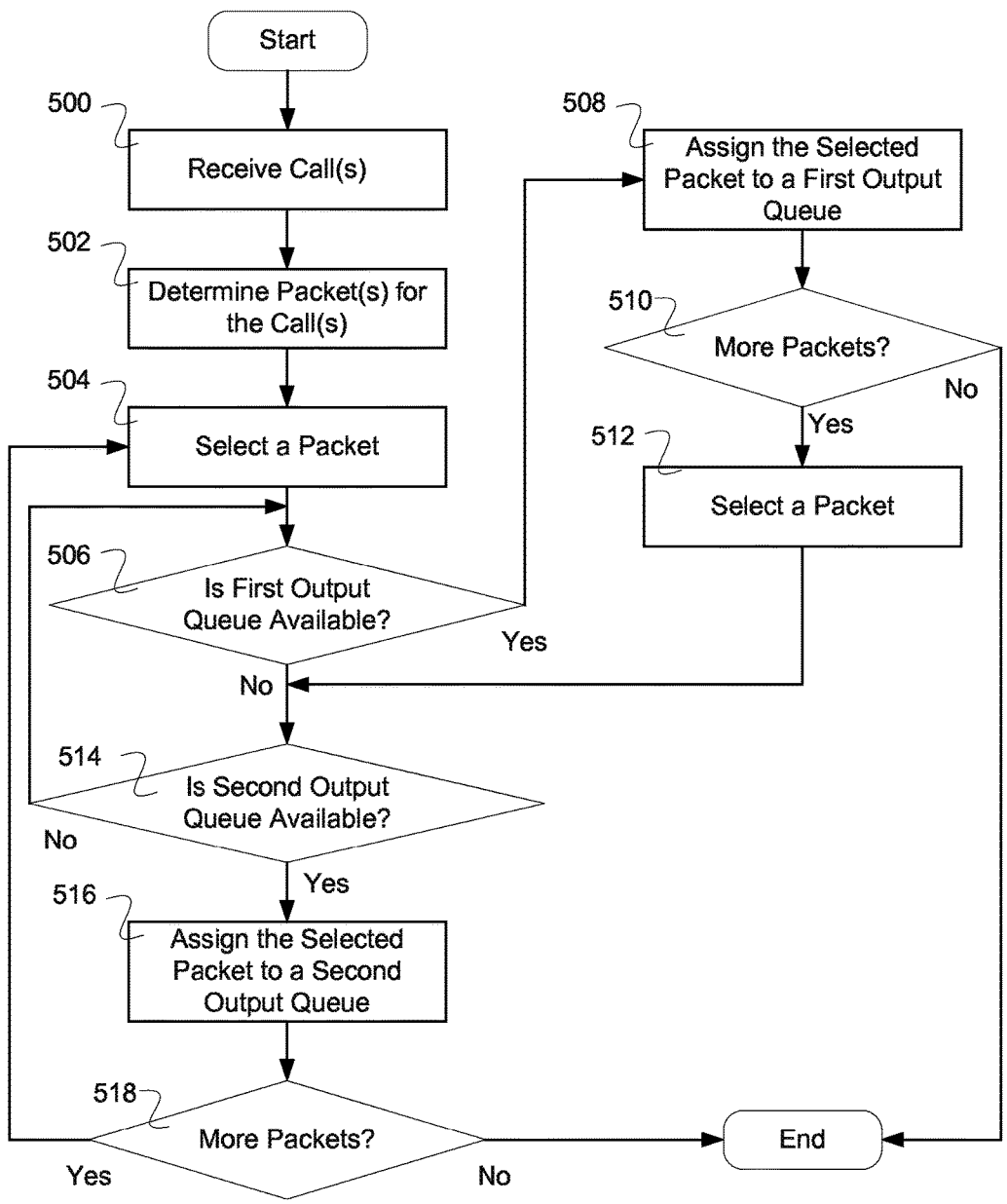
FIG. 5 is a flow diagram illustrating an embodiment of a process for sending a command stream.

FIG. 5 is a flow diagram illustrating an embodiment of a process for sending a command stream. In some embodiments, the process of FIG. 5 is performed by a segment (e.g., segment 300 of FIG. 3). In the example shown, in 500, call(s) is/are received. In 502, packet(s) for the call(s) are determined. For example, each of the calls is broken into one or more packets as appropriate. In some embodiments, the packet(s) is/are placed in a queue for sending out. In the event that the first output queue is not available, then control passes to 514. In 504, a packet is selected. In 506, it is determined whether a first output queue is available. In the event that the first queue is available, in 508 the selected packet is assigned to the first output queue. For example, the packet is put in an output buffer, sent out, and then an acknowledgement is waited for before indicating that the output buffer is free for the next packet. If an acknowledgement is not received before a predetermined time, then the packet is sent again and the predetermined time is extended (e.g., doubled). In 510 it is determined whether there are more packets to send. In the event that there are not any more packets, the process ends. In the event that there is another packet, then in 514 it is determined whether a second output queue is available. In the event that the second output queue is not available, then control passes to 506. In the event that the second queue is available, the selected packet is assigned to the second output queue. For example, the packet is put in an output buffer, sent out, and then an acknowledgement is waited for before indicating that the output buffer is free for the next packet. If an acknowledgement is not received before a predetermined time, then the packet is sent again and the predetermined time is extended (e.g., doubled). In 518, it is determined whether there are more packets. In the event that there are more packets, then control passes to 504. In the event that there no more packets, then the process ends.

Figure 6:
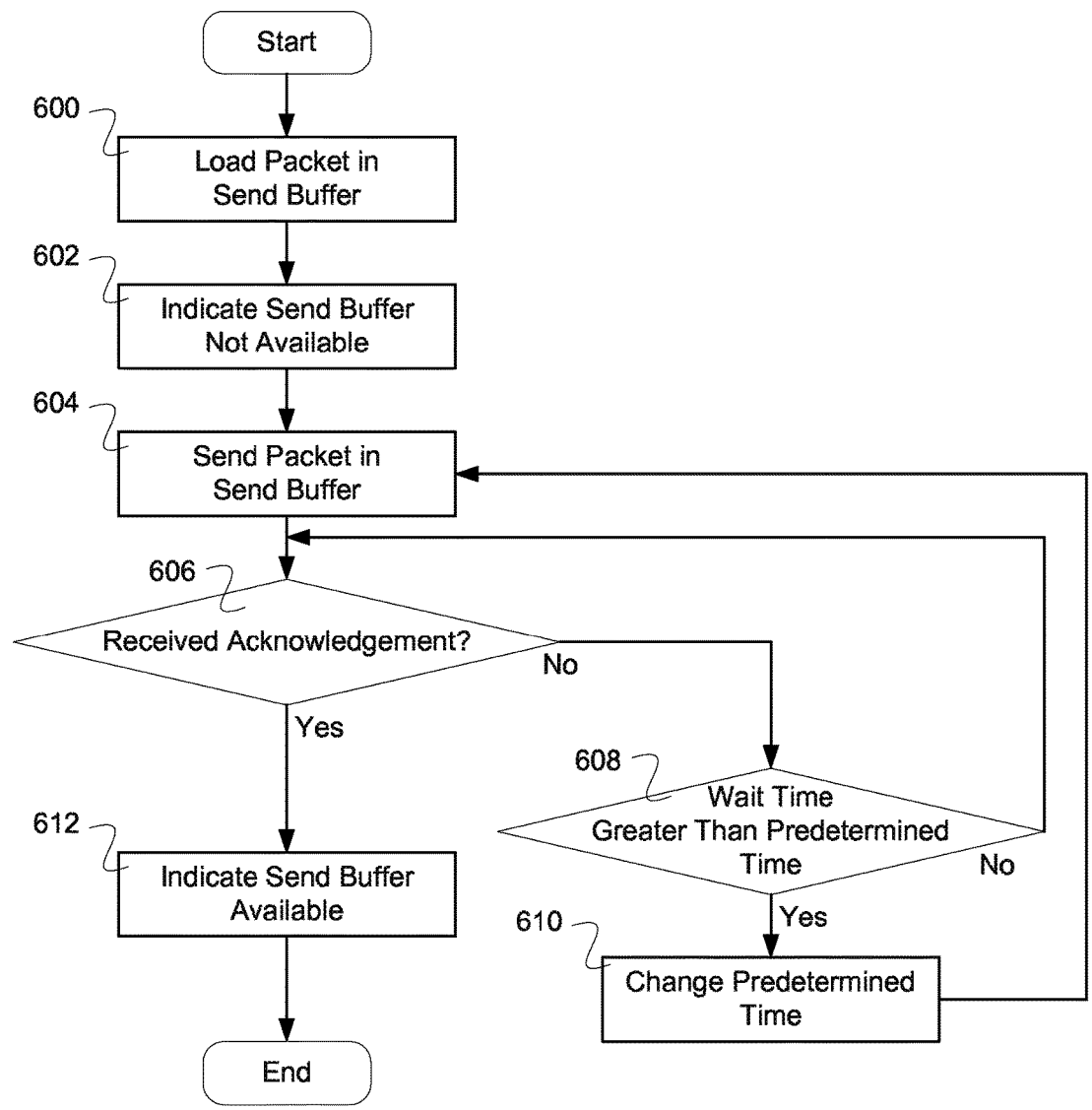
FIG. 6 is a flow diagram illustrating an embodiment of a process for sending a packet.

FIG. 6 is a flow diagram illustrating an embodiment of a process for sending a packet. In some embodiments, the process of FIG. 6 is used to implement 508 or 516 of FIG. 5. In the example shown, in 600 a packet is loaded in a send buffer. In 602, it is indicated that the send buffer is not available. In 604, the packet in send buffer is sent. In some embodiments, the packet is sent to a metadata node. The metadata node sends a packet acknowledgement in the event that the packet is received. The packet is stored in a sequence buffer until all packets of a call are able to be reassembled. The reassembled call is placed in a call queue. The sequence buffer is one of a plurality of sequence buffers each corresponding to a send buffer. For example, each sequence buffer stores packets from a send buffer until a call is all stored. Each call is then placed in the call queue to be processed (e.g., the call is processed by a name node to retrieve data from a database—a value, a cell, a row, a set of data, etc.). In 606, it is determined whether an acknowledgement has been received. In the event that an acknowledgment has been received, in 612 it is indicated that the send buffer is available. For example, another packet is loaded after the indication indicates that the buffer is available. In the event that an acknowledgement has not been received, in 608 it is determined whether a wait time is greater than a predetermined time. In the event that the wait time is not greater than the predetermined time, then control passes to 606. In the event that the wait time is greater than the predetermined time, then in 610 the predetermined time is changed. For example, the predetermined time is increased (e.g., doubled, tripled, etc.) to back off the sending of another packet, and control passes to 604 (e.g., where the packet is resent).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for sending a command stream to a distributed data storage system having a plurality of data nodes connected together by a network and having a metadata node storing metadata describing data stored at said plurality of data nodes, comprising:
   one or more hardware processors coupled to a memory, the memory storing executable instructions for configuring the one or more hardware processors to:
   receive a call in connection with executing a slice or a query to the distributed data storage system, the call comprising a sequence of packets that form the call;
   determine first and second packets of the sequence of packets for the call;
   assign the first packet of the sequence of packets to a first output queue;
   assign the second packet of the sequence of packets to a second output queue;
   send the first packet from the first output queue to the metadata node,
   the metadata node being configured to return an acknowledgment of a received packet and being configured to reassemble received packets using said metadata into said sequence of packets to form the call;
   determine whether a first packet acknowledgement of the first packet is received from the metadata node within a first acknowledgement wait time, wherein the first packet acknowledgement is to be received using a same protocol with acknowledgement as a protocol that was used for sending the first packet to the metadata node;
   in response to the first packet acknowledgement not being received within the first acknowledgement wait time:
   resend the first packet; and
   modify the first acknowledgement wait time;
   upon receipt of the first packet acknowledgment, assign another packet to the first output queue and send the second packet from the second output queue to the metadata node;
   repeat assigning other packets for said call alternately to said first and to said second output queues and sending said other packets alternately from said first and from said second output queues until all of said sequence of packets have been sent to the metadata node and acknowledged; and
   a communication interface of said metadata node configured to communicate with one or more of said plurality of data nodes over a communication channel, wherein the metadata node is configured to reassemble said received packets using said metadata into said sequence of packets to form said call and to send said sequence of packets to one or more of said plurality of data nodes for execution of said slice of said query.

2. The system of claim 1, wherein the one or more hardware processors are configured to receive packet acknowledgments.

3. The system or claim 1, wherein modifying the first acknowledgement wait time comprises doubling the first acknowledgement wait time.

4. The system of claim 2, wherein the one or more hardware processors are further configured to:
   upon a packet acknowledgement being received within the first acknowledgement wait time:
   indicate to an output interface to send a first packet of a new call from the second output queue.

5. The system of claim 2, wherein the one or more hardware processors are further configured to:
   upon the first packet acknowledgement being received within the first acknowledgement wait time:
   indicate to an output interface to send the second packet from the second output queue while another new packet is being sent to the first output queue.

6. The system of claim 5, wherein the one or more hardware processors are configured to receive a second packet acknowledgement, and to determine whether the second packet acknowledgement is received within a second acknowledgement wait time.

7. The system of claim 6, wherein the one or more hardware processors are further configured to:
   in the event the second packet acknowledgement is not received within the second acknowledgement wait time:
   resend the second packet; and modify the second acknowledgement wait time.

8. The system of claim 7, wherein modifying the second acknowledgement wait time comprises doubling the second acknowledgement wait time.

9. The system of claim 6, wherein the one or more hardware processors are further configured to:
   in the event the second packet acknowledgement is received within the second acknowledgement wait time: indicate to the output interface to send a third packet from the first output queue.

10. The system of claim 1, wherein the one or more hardware processors are further configured to send the second packet from the second output queue.

11. The system of claim 10, wherein the one or more hardware processors are further configured to wait until the first packet acknowledgement has been received before sending the second packet from the second output queue.

12. The system of claim 10, wherein the one or more hardware processors are further configured to not wait until the first packet acknowledgement has been received before sending the second packet from the second output queue.

13. The system of claim 1, wherein the metadata node sends the first packet acknowledgement in the event that the first packet is received.

14. The system of claim 13, wherein the first packet is stored in a sequence buffer until all packets of the call are able to be reassembled.

15. The system of claim 14, wherein the reassembled call is placed in a call queue.

16. The system of claim 14, wherein the sequence buffer is one of a plurality of sequence buffers each corresponding to a send buffer.

17. The system of claim 1, wherein said sequence of packets sent to the metadata node are sent using a connectionless protocol.

18. The system or claim 1, wherein in the event that the first packet acknowledgement is not received during said modified first acknowledgment wait time, the first acknowledgment wait time is further modified.

19. The system of claim 1, wherein the first acknowledgment wait time is further modified with each successive resend of the first packet.

20. A method for sending a command stream to a distributed data storage system having a plurality of data nodes connected together by a network and having a metadata node storing metadata describing data stored at said plurality of data nodes, comprising:
receiving a call in connection with executing a slice of a query to the distributed data storage system, the call comprising a sequence of packets that form the call;
determining, using a hardware processor, first and second packets of the sequence of packets for the call;
assigning the first packet of the sequence of packets to a first output queue;
assigning the second packet to a second output queue;
sending the first packet from the first output queue to the metadata node;
determining whether a First packet acknowledgement of the First packet is received within a first acknowledgement wait time, wherein the first packet acknowledgement is to be received using a same protocol with acknowledgement as a protocol that was used for sending the first packet to the metadata node;
in response to the first packet acknowledgement not being received within the first acknowledgement wait time: resending the first packet; and modifying the first acknowledgement wait time;
upon receipt of the first packet acknowledgment, assigning another packet to the First output queue and sending the second packet from the second output queue to the metadata node;
repeating assigning other packets for said call alternately to said first and to said second output queues and sending said other packets alternately from said first and from said second output queues until all of said sequence of packets has been sent to the metadata node and acknowledged; and
reassembling by said metadata node using said metadata received packets into said sequence of packets that form said call and sending said sequence of packets to one or more of said plurality of data nodes for execution of said slice of said query.

21. A computer program product for sending a command stream to a distributed data storage system having a plurality of data nodes connected together by a network and having a metadata node storing metadata describing data stored at said plurality of data nodes, the computer program product comprising a tangible non-transitory computer readable storage medium and comprising computer instructions for:
receiving a call in connection with executing a slice of a query to the distributed data storage system, the call comprising a sequence of packets that form the call;
determining, using a hardware processor, first and second packets of the sequence of packets for the call;
assigning the first packet of the sequence of packets to a first output queue; assigning the second packet to a second output queue;
sending the first packet from the first output queue to the metadata node, the metadata node being configured to return an acknowledgment of a received packet and being configured to reassemble received packets using said metadata into said sequence of packets to form said call;
determining whether a first packet acknowledgement of the first packet is received within a first acknowledgement wait time, wherein the first packet acknowledgement is to be received using a same protocol with acknowledgement as a protocol that was used for sending the first packet to the metadata node;
in response to the first packet acknowledgement not being received within the first acknowledgement wait time:
resending the first packet; and
modifying the first acknowledgement wait time;
upon receipt of the first packet acknowledgment, assigning another packet to the First output queue and sending the second packet from the second output queue to the metadata node; and
repeating assigning other packets for said call alternately to said first and to said second output queues and sending said other packets alternately from said first and from said second output queues until all of said sequence of packets has been sent to the metadata node and acknowledged; and
reassembling by said metadata node using said metadata said received packets into said sequence of packets that form said call and sending said sequence of packets to one or more of said plurality of data nodes for execution of said slice of said query.

* * * * *